United States Patent [19]

Shiga

[11] Patent Number: 4,535,866
[45] Date of Patent: Aug. 20, 1985

[54] THREE-WHEELED MOTOR VEHICLE

[75] Inventor: Mitsuo Shiga, Saitama, Japan

[73] Assignee: Honda Giken Kogyo Kabushiki Kaisha, Tokyo, Japan

[21] Appl. No.: 487,734

[22] Filed: Apr. 22, 1983

[30] Foreign Application Priority Data

Apr. 22, 1982 [JP] Japan .................................. 57-68524

[51] Int. Cl.³ .............................................. B60K 11/04
[52] U.S. Cl. .................................... 180/215; 180/68.4; 180/291
[58] Field of Search ............... 180/215, 217, 226, 229, 180/681, 68.4, 68.6, 291; 123/41.49

[56] References Cited

U.S. PATENT DOCUMENTS 3,978,938  9/1976  Joscher et al. ..................... 180/68.4
4,237,996  12/1980  Matsuda et al. .................... 180/229
4,287,960  9/1981  McConnell ..................... 180/217 X Primary Examiner—Joseph F. Peters, Jr.
Assistant Examiner—Charles R. Watts
Attorney, Agent, or Firm—Armstrong, Nikaido, Marmelstein & Kubovcik

[57] ABSTRACT

A three-wheeled motor vehicle including one steerable front wheel, two rear wheels serving as driving wheels, a fuel tank disposed on an upper portion of a frame, a seat disposed behind the fuel tank, and an engine mounted below the fuel tank. The above engine is a water-cooled engine. A cylinder portion of the engine is disposed on the rear side in the longitudinal direction of a case portion of the engine which case portion underlies the cylinder portion, and a radiator is disposed within a space formed in front of the cylinder portion. By the above arrangement, a large space is ensured in front of the cylinder portion without the need to enlarge the longitudinal size of the three-wheeled motor vehicle, and cooling devices can be disposed within such space.

6 Claims, 2 Drawing Figures

THREE-WHEELED MOTOR VEHICLE

BACKGROUND OF THE INVENTION

1. Field of the Invention

The present invention relates to an improvement in arrangement of a radiator of a three-wheeled motor vehicle which carries thereon a water-cooled engine.

2. Relevant Art

Three-wheeled motor vehicles provided with ultra-low pressure tires called "balloon tire" for mainly off roads are in practical use, whose engines are mainly air-cooled engines.

In case a water-cooled engine is to be mounted on this type of three-wheeled motor vehicle, it is required to provide a radiator, water piping, etc. and it is very difficult to ensure a space for these cooling devices. Particularly, since this type of three-wheeled motor vehicle runs on a waste, sandy or muddy land, it is required to provide a cover or the like for protecting the radiator core and cooling fan against bounding stones and splashing mud, sand or the like, resulting in a larger space required for the cooling devices. Thus, the adoption of a water-cooled engine for this type of three-wheeled motor vehicle has heretofore been difficult in point of ensuring space.

The present invention has been accomplished in view of the above-mentioned problem associated with the provision of cooling devices in the case of mounting a water-cooled engine on a three-wheeled motor vehicle.

SUMMARY OF THE INVENTION

According to the present invention there is provided a three-wheeled motor vehicle in which a cylinder portion of an engine comprising a crank case, the cylinder portion, etc. is disposed rearward, that is, the front and the rear of the engine are reversed, to thereby ensure a space in front of the cylinder portion, and cooling devices such as a radiator and a cooling fan are disposed in that space.

Accordingly, it is the object of the present invention to provide a three-wheeled motor vehicle permitting cooling devices to be disposed by utilization of the space formed in front of the cylinder portion as mentioned above, which is advantageous to an effective utilization of space, and capable of ensuring such space in the original size as it is without causing increase in size in the longitudinal direction of the motor vehicle.

The aforementioned object and advantage of the present invention will become more apparent from the following description of an embodiment of the invention taken in connection with the accompanying drawings.

DETAILED DESCRIPTION OF THE INVENTION

Figure 1:
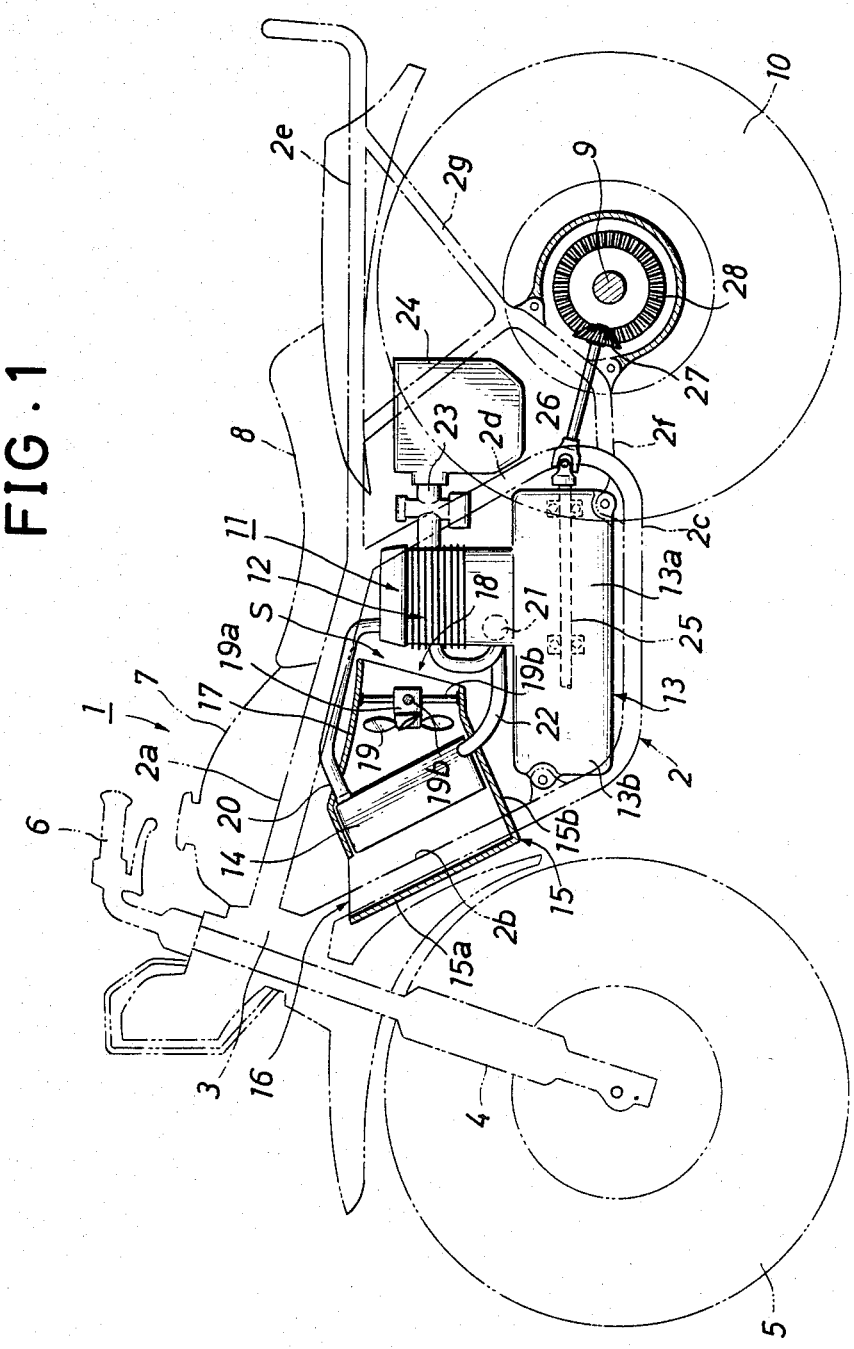
FIG. 1 is a typical, schematic side view of a three-wheeled motor vehicle embodying the present invention.
Figure 2:
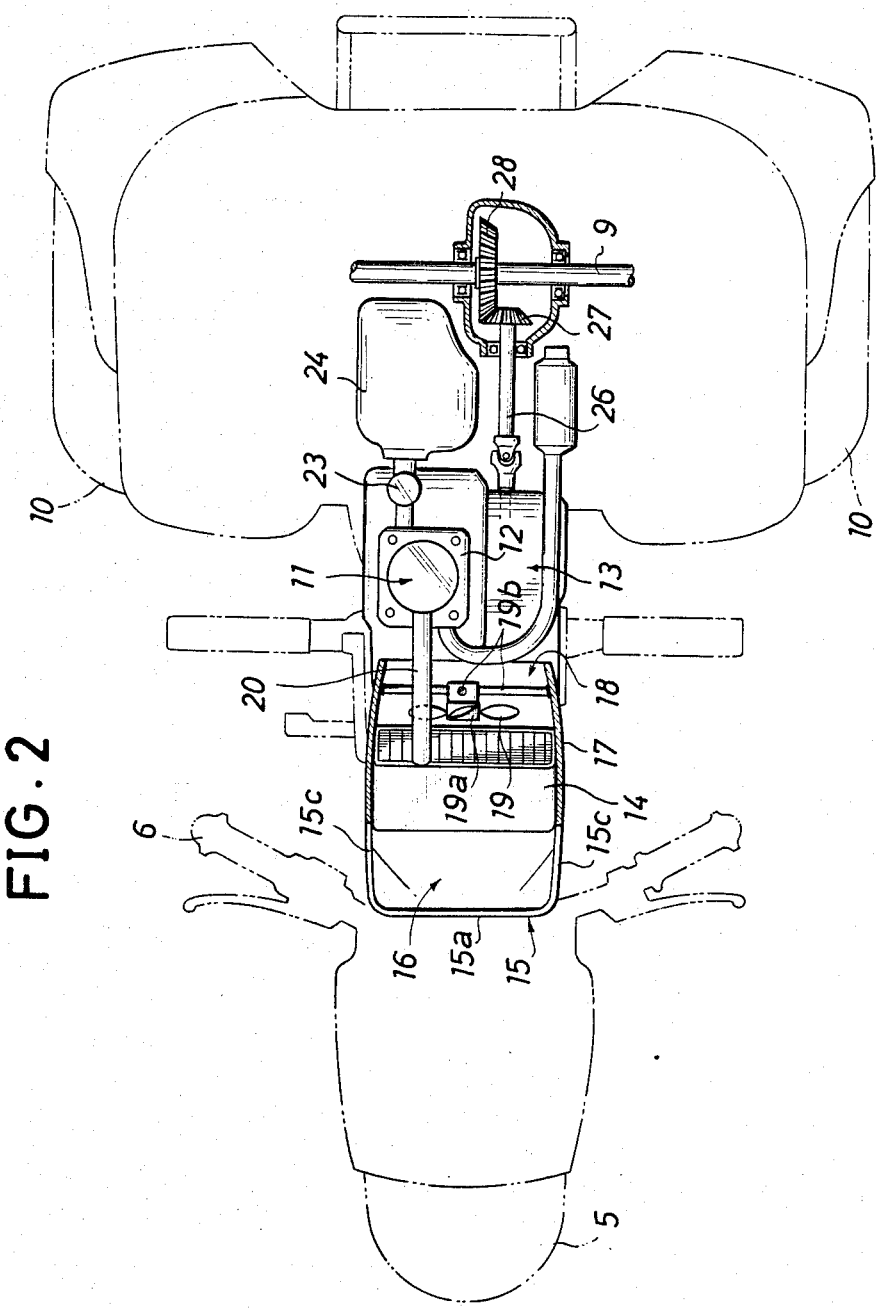
FIG. 2 is a plan view thereof.

In a three-wheeled motor vehicle 1, a front fork which supports a steerable single front wheel 5 is supported by a head tube 3 mounted at the front end of a frame 2, and steering is effected by a handle 6 mounted on a top bridge. The frame 2 comprises a main pipe 2a extending backward from an upper portion of the head tube 3, a down tube 2b extending rearwardly downward from a lower portion of the head tube 3, a center pipe 2d extending upward from the rear end of a lower portion 2c of the down tube 2b and connected with the rear end of the main pipe 2a, a rear pipe 2e extending backward from the rear end of the main pipe 2a, a sub-frame 2f connecting between a lower portion of the center pipe 2d and an intermediate portion of the rear pipe 2e, and a reinforcing pipe 2g connecting between the sub-frame 2f and the rear pipe 2e.

A fuel tank 7 is mounted over a front to an intermediate portion of the main pipe 2a of the frame 2, and a seat 8 is mounted over from a rear portion of the main pipe to a front portion of the rear pipe 2e. To the lower rear portion of the sub-frame 2f is mounted an axle 9 in the transverse direction, with rear wheels 10 being mounted on both ends thereof. A shaft drive type rear wheel driving system is shown in the embodiment.

An engine 11 is mounted on the lower portion 2c of the down tube 2b of the frame 2 in a position below the fuel tank 7 and seat 8. The engine 11 comprises a cylinder portion 12 comprising a cylinder head and a cylinder block and a case portion 13 positioned thereunder comprising a crank case and a transmission case. The cylinder portion 12 faces an upper rear portion of the case portion 13, which is reverse in the longitudinal direction to the ordinary type of engine. The rear part of the case portion 13 positioned just under the cylinder portion 12 is a crank case 13a and the front part contiguous thereto is a transmission case 13b. Thus, a space S is formed in front of the cylinder portion 12 of the engine 11, below the front portion of the seat 8, behind the down tube 2b and above the transmission case 13b. Within the space S are disposed cooling devices. More specifically, in a longitudinally intermediate portion of the space S is disposed a radiator 14 longitudinally so as to be inclined forwardly upward, and in front of the radiator 14 is disposed a protector 15 having an upper opening 16. The protector 15 comprises a front wall 15a, a bottom wall 15b and right and left side walls 15c, with a space being formed between the front wall 15a and the front face of the radiator 14. The rear ends of the bottom wall 15b and side walls 15c extend up to the side and bottom portions of the radiator 14, and in this embodiment the front wall 15a faces from an intermediate to an upper portion of the down tube 2b. Further, the front wall 15a and side walls 15c are extended up to near the upper end of the radiator 14 to define the upper opening 16. The front bottom of the fuel tank 7 faces above the opening 16 in spaced relation. Behind the radiator 14 is mounted a shroud 17 cylindrically. The front end of the shroud 17 faces the back of the radiator 14, while its rear end is opened at 18 and faces the front of the cylinder portion 12 of the engine. Within the shroud 17 is disposed a cooling fan 19. The cooling fan 19 has a body 19a which contains a motor, the body 19a being supported by the inner wall of the rear portion of the shroud 17 through supporting stays 19b extending radially from the outer periphery of the body 19a. Between the top of the cylinder head of the cylinder portion 12 and an upper portion of the radiator 14 is disposed a pipe 20 for return of warm water after use for cooling, while between a lower portion of the radiator 14 and the cylinder block is disposed a cooling water feed pipe 22 through a water pump 21. A carburetor 23 and an air cleaner 24 are disposed behind the cylinder portion 12. An output shaft 25 extends longitudinally within the crank case and the transmission case, and its rear end is connected to a propeller shaft 26. To the rear end of the propeller shaft 26 is fixed an output gear 27 such as, for example, a bevel gear, while a driving gear 28 such as, for example, a final bevel gear, is mounted on the axle 9, the gears 27 and 28 being engaged with each other to transmit the engine output to the rear wheels 10 to thereby drive the latter.

Function and effect of the above-described construction will now be described. The air is taken in from the upward opening 16 of the protector 15 positioned below the front portion of the fuel tank, passes through the core of the radiator 14 and is discharged from the rear end opening 18 of the shroud 17. Intake of the air is done forcibly by operation of the cooling fan 19 to cool the radiator core. The front of the radiator 14 is covered with the protector 15, the air is taken in from the upward opening 16, and the bottom plate of the fuel tank 7 faces above the opening 16, so that the entry of mud, grit, sand, water or other foreign matter into the radiator 14 is prevented, and the radiator is protected from bounding stones or the like. Further, since the cooling fan 19 is surrounded with the shroud 17, it is protected from mud, sand, grit, water, bounding stones, and the like. And the cooling device including these covers can be accommodated with the front space formed by disposing the engine so that the cylinder portion is positioned in the rear.

In the present invention, as described hereinabove, since the engine is disposed in the foregoing manner in a three-wheeled motor vehicle, the space in front of the cylinder portion can be taken large enough to dispose therein the radiator including the protector and the cooling fan including the shroud without any compulsion in the longitudinal direction, and an effective water-cooled engine can be mounted on a three-wheeled motor vehicle for off roads while attaining protection of cooling devices. And these are attainable by an effective utilization of space without causing increase in size of the external form. Thus, the present invention affords various advantages.

What is claimed is:

1. A three-wheeled motor vehicle including a frame, one steerable front wheel attached to said frame, two rear wheels attached to said frame and serving as drive wheels, a fuel tank mounted on an upper portion of said frame, a seat mounted on said frame behind said fuel tank, an engine mounted on a lower portion of said frame, said engine being a water cooled engine and comprising a cylinder portion comprising a cylinder head and cylinder block and a crankcase portion which underlies said cylinder portion, a transmission case integral with said crankcase portion having a transmission-containing portion forward of said crankcase portion, and a radiator being disposed within a space formed in front of said cylinder portion of said engine.

2. A three-wheeled motor vehicle according to claim 1 wherein said radiator is disposed above at least a portion of said transmission case.

3. A three-wheeled motor vehicle according to claim 1, wherein a cooling fan is disposed behind said radiator.

4. A three-wheeled motor vehicle according to claim 3, wherein said radiator and said cooling fan are covered with a cover so that cooling air is taken in from the front of said radiator and discharged from an opening formed behind said fan.

5. A three-wheeled motor vehicle according to claim 1, wherein the circumference and the front of said radiator are covered with a cover.

6. A three-wheeled motor vehicle according to claim 5, wherein said cover is opened upward in front of said radiator to take in cooling air.

* * * * *